UNITED STATES PATENT OFFICE 2,675,391

PREPARATION OF ALKYL ISODEHYDRO-ACETATES FROM ALKYL ACETOACETATES USING HCl IN ETHYL SULFURIC ACID AS CONDENSING AGENT

De Walt S. Young and Norman M. Atkins, Kingsport, Tenn., assignors to Eastman Kodak Company, Rochester, N. Y., a corporation of New Jersey No Drawing. Application February 15, 1952, Serial No. 271,852

15 Claims. (Cl. 260—343.5)

This invention relates to the condensation of alkyl acetoacetates to form alkyl isodehydroacetates employing as the condensing agent solutions of hydrogen chloride in ethyl sulfuric acid.

This invention is related to that disclosed in a copending application Serial No. 218,268 filed March 29, 1951, by J. M. Straley and B. C. Wininger, now U. S. Patent No. 2,607,781 dated August 19, 1952. The Straley et al. specification clearly points out the prior art. Straley et al. disclose and claim condensing alkyl acetoacetates to form alkyl isodehydroacetates employing sulfur trioxide, especially solutions of sulfur trioxide in certain organic solvents which do not interfere with the course of the reaction. The present invention is also related to a copending application filed by us on even date herewith, Serial No. 271,853 wherein solutions are employed of sulfur trioxide in a solvent which is restricted to sulfuric acid. The present invention employs substantially anhydrous hydrogen chloride dissolved in ethyl sulfuric acid which is an active component of the condensing agent. By means of the present invention, side reactions due to the presence of organic solvents as disclosed by Straley et al. are substantially avoided.

The disadvantages of the prior art include low yields of alkyl isodehydroacetate, undesirably large yields of free isodehydroacetic acid which can only be esterified with difficulty, bothersome yields of by-products which may form complexes thereby interfering with good yields of the desired ester, corrosive nature of the condensing agents on the reaction vessel and associated equipment, cost of condensing agents and equipment, extremely long periods of time required to obtain worthwhile yields, etc.

According to the prior art, results have been obtained as illustrated in the following table which compares such results with those obtained by work done in our laboratories including that obtainable according to the instant invention and the above referred to application filed concurrently herewith. Processes A and B result in a good conversion of ethyl acetoacetate to ethyl isodehydroacetate (3) which compares favorably with the prior art processes. The most important point to be noted is the high recovery of ethyl acetoacetate (2) which is several times the recovery obtainable by any of the tabulated prior art processes. Another point of importance is the shortened reaction time for processes A and B compared to the tabulated prior art (however, under high temperatures and pressures, U. S. 2,529,917 discloses equally short reaction periods). Another important point is the high yield obtained based on the ethyl acetoacetate consumed (7) which is markedly greater than any of the other tabulated processes except for that of U. S. 2,529,917 (process F). The process of U. S. 2,529,917 has the disadvantage of requiring expensive high pressure equipment accompanied by extensive corrosion problems due to the presence of hydrogen chloride at elevated temperatures and pressures. Other disadvantages of the prior art processes have been referred to above.

*Ethyl acetoacetate conversion to ethyl isodehydroacetate*

| Process[1] | Condensing Agent | Ester Recovery[2] | Conversion to— | | | | Process Time | Yield from Ester used[7] |
|---|---|---|---|---|---|---|---|---|
| | | | Ester[3] | Acid[4] | Lactone[5] | Unaccounted[6] | | |
| | | Percent | Percent | Percent | Percent | Percent | | Percent |
| A | $SO_3$ in $H_2SO_4$ | 39 | 51.8 | [8]3 | [8]3 | ca. 3 | 16–18 Hrs | 84.5 |
| B | HCl in $EtHSO_4$ | 45 | 43.5 | [8]3 | [8]4 | ca. 4 | do | 79 |
| C | $H_2SO_4$ | [11] | 41 | 41 | [11] | [11] | 2 Weeks | 41 |
| D | $H_2SO_4$ | ca. 0 | 38 | 36 | | 24 | 2 | do | 38 |
| E | 97% $H_2SO_4$ | ca. 0 | 48 | 13 | | 11 | 28 | 72 Hrs | 48 |
| F | HCl | 15 | 65 | 6 | [10] | 3 | 48 Hrs | 75 |
| G | HCl | [11] | 63 | [9] | [9] | [11] | 2 Weeks | 63 |

[1] Processes are: A and B are as described in this and the application filed concurrently herewith; C is as described by Hantzsch, Ann., 222, 9; D is as described by Anschutz, Ann., 259, 152; E relates to recent work in our laboratories related to improvements on C and D; F is as described in U. S. 2,529,917 by coworkers; G is as described by Goss et al., J. Chem. Soc. 123, 327.
[2] Percent of ethyl acetoacetate ester starting material recovered or recoverable.
[3] Percent converted to ethyl isodehydroacetate ester.
[4] Percent converted to isodehydroacetic acid.
[5] Percent converted to mesiten lactone.
[6] Percent converted to unidentified byproducts.
[7] Percent yield based on the ethyl acetoacetate ester consumed in the reaction.
[8] The mesiten lactone and the isodehydroacetic acid were not isolated except as an intermediate and a high boiling fraction during separation of the unreacted ethyl acetoacetate ester.
[9] No data was given by Hantzsch or Goss et al.
[10] Mesiten lactone was substantially absent but about 11–12% ethyl chloride was formed.
[11] Hantzsch appears to leave about 18% and Goss et al. appear to leave about 37% of their ethyl acetoacetate starting material unaccounted for; however, it is most probable that the majority of these percentages were converted to undesired byproducts with very little if any of the starting material being recoverable.

We have found that a particular range of concentrations of hydrogen chloride dissolved in ethyl sulfuric acid can be used to promote the self-condensation of esters of acetoacetic acid to form the corresponding esters of isodehydroacetic acid. We have found that by our new process, good yields of the desired isodehydroacetate esters are obtained together with very low yields of the free isodehydroacetic acid; moreover, yields of by-products are similarly low. As a result the reaction mixture from our new process contains the desired ester together with unreacted alkyl acetoacetate in sufficiently large quantity to make it practicable to subject the acetoacetate to a second condensation similar to the original reaction whereby the overall yields are much higher than could be expected according to the prior art. By employing solutions of hydrogen chloride in ethyl sulfuric acid according to our invention, free isodehydroacetic acid is not formed in amounts sufficient to result in the solid complex which can be an undesirable by-product when only sulfuric acid is employed. Based on the quantity of alkyl acetoacetate consumed we have obtained excellent yields in accordance with our new process.

The principal reaction which takes place in accordance with our invention can be represented as follows:

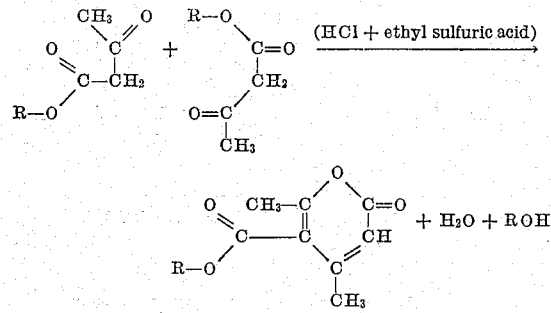

wherein R represents an alkyl radical.

It is an object of our invention to provide an improved process for the manufacture of alkyl esters of isodehydroacetic acid. A further object of our invention is to provide particularly advantageous condensing agent for employment in the condensation of alkyl esters of acetoacetic acid to form the alkyl esters of isodehydroacetic acid. Other objects will become apparent hereinafter.

In practicing our invention, we have found that while temperatures at least as high as 30° C. may be used, it is more advantageous to use temperatures no higher than room temperatures. It is preferred to employ temperatures, especially during the mixing of the components of the reaction mixture, which are in the range of about −20° to 20° C. Illustrations of the optimum temperatures employable are set forth in the examples described below. Temperatures below −20° C. can be employed.

Moisture should be substantially excluded in all condensations performed in accordance with our invention.

It is advantageous to add the condensing agent in a thoroughly premixed condition to an alkyl acetoacetate dropwise with stirring and at a temperature close to zero. This addition can be advantageously conducted over an extended period of time, e. g. from 60 to 200 minutes although there is nothing critical about this as long as the temperature is not permitted to rise unduly. After this mixing operation is completed the stirring can be stopped and the reaction mixture allowed to stand for several hours, e. g. 12–24 hours or longer; however, stirring need not be discontinued if a somewhat more rapid reaction is desired. Not more than 24 hours is ordinarily needed and 18 hours is generally sufficient. However, when the reaction is conducted at or above room temperatures and/or with continuous stirring the period of time should not be too extensive in order to avoid undue formation of undesirable products.

Upon substantial completion of the condensation, the alkyl isodehydroacetate can be separated by pouring the reaction mixture onto ice or into cold water and adding a nonwater-miscible solvent such as an aromatic or aliphatic hydrocarbon or halogenated derivative, e. g. benzene, toluene, xylene, carbon tetrachloride, chlorobenzene, etc. The organic layer which forms contains the desired product which can then be separated out by distillation and can be further purified by any suitable means. Other methods of separating the product from the reaction mixture are also clearly possible and can be applied.

The alkyl acetoacetates which can be advantageously employed include methyl, ethyl, and n-propyl acetoacetates. However, any of the lower alkyl esters can be employed. Thus we can employ any of the alkyl acetoacetates, especially those containing from one to six carbon atoms in the alkyl radical, thereby producing alkyl isodehydroacetates which correspond thereto.

The following example serves to illustrate our invention as disclosed in our copending application filed on even date herewith wherein a 32% solution of sulfur trioxide in sulfuric acid is employed as the condensing agent.

Example 1

*First stage.*—780 grams of ethyl acetoacetate was placed in a reaction vessel equipped with an agitator, thermometer, dropping funnel, and a calcium chloride tube for protection from moisture in the air. The temperature was reduced to −5° C. Next, 220.5 grams of 65% oleum and 220.5 grams of 97% sulfuric acid were mixed together and added dropwise with stirring to the ethyl acetoacetate at about 0° C. over a period of 2½ hours. Agitation was then discontinued and the mixture allowed to stand for 18 hours at from 0° to −5° C. The reaction mixture was then poured into 3 liters of water at below 10° C. After stirring for 20 minutes the product was extracted with benzene, washed with 5% sodium bicarbonate, and the benzene was then removed by distillation. Finally, the crude product was fractionated at 12 mm. Hg pressure yielding 331.8 grams of ethyl acetoacetate (starting material) distilling at 65–70° C. and 285.7 grams of ethyl isodehydroacetate distilling at 150°–176° C. This completed the first stage of the reaction. Based on the acetoacetate consumed, the yield was 84.7%.

*Second stage.*—The 331.8 grams of ethyl acetoacetate recovered was condensed in the presence of 93.5 grams of 65% oleum and 93.5 grams of 97% sulfuric acid in exactly the same manner as in the first stage. From the second stage the yield was 145 grams of ethyl acetoacetate and 115 grams of ethyl isodehydroacetate. Based on the ethyl acetoacetate consumed in both stages, the overall yield was 83.6%.

Based on the total amount of ethyl acetoacetate employed, the overall yield was 68.1%; however, a third stage of the process can be performed on the 145 grams of ethyl acetoacetate recovered from the second stage whereby the overall yield based on the ethyl acetoacetate employed is in the vicinity of 75%. A fourth stage can also be employed if desired.

The various stages of the process as described above can be combined into a continuously operative process if desired.

The condensing agents employed in accordance with this invention comprise solutions of hydrogen chloride in an approximately equimolecular quantity of ethyl sulfuric acid which have been found to be unusually effective condensing agents. Such a solution can be prepared by adding dropwise approximately 70 to 73 parts by weight of chlorsulfonic acid to about 28 to 31 parts by weight of 95% ethyl alcohol (theoretical ratio is about 71.65 acid to 28.35 absolute alcohol) over a period of several hours excluding contact with atmospheric moisture. Such a solution can also be prepared by other obvious means. Such solutions are employed as condensing agents in the same manner as the solutions of sulfur trioxide in sulfuric acid described in the copending application filed by us on even date herewith, except that much larger quantities of these solutions can be advantageously employed in proportion to the quantity of alkyl acetoacetate being condensed. Thus, as much as three times the weight of this condensing agent based on the weight of the alkyl acetoacetate can be advantageously employed. Moreover, quantities as small as half the weight of the alkyl acetoacetate can be advantageously employed. Larger or smaller quantities can also be employed.

As pointed out above, the process of the instant invention can be advantageously performed by the same means as in Example 1 except that the condensing agent is a solution of hydrogen chloride in ethyl sulfuric acid. Examples 2, 3 and 4 illustrate the instant invention particularly in regard to stage 1. As in Example 1, a second, a third and possibly more stages can be advantageously employed whereby the overall yield obtained can be well in excess of 70%.

*Example 2*

349.5 grams of chlorsulfonic acid was added dropwise to 145.0 grams of 95% ethyl alcohol out of contact with moist air over a period of 3 hours. The temperature was maintained at 10° to 20° C. during this addition. The resulting solution was then gradually added with stirring over a period of 1½ hours to 260 grams of ethyl acetoacetate at from 0° to 5° C. with atmospheric moisture being excluded. The reaction mixture was then allowed to stand without agitation for about 17 hours at from −10° to 0° C. Finally, the mixture was poured into an excess of water and purified as in the preceding examples. The weight of the ethyl isodehydroacetate obtained was 85.3 grams distilling at 150°–186° C. at 12 mm. of Hg pressure; this represented a yield of 79% based on the amount of ethyl acetoacetate consumed. Weight of the recovered ethyl acetoacetate was 117.0 grams. The yield based on the total amount of ethyl acetoacetate employed was about 43.5% but by following the procedure set forth in the preceding examples, a second and third stage of the process can be performed whereby an overall yield of about 70% can be obtained.

*Example 3*

116.5 grams of chlorsulfonic acid was added dropwise to 46.0 grams of 95% ethyl alcohol out of contact with moist air; the temperature was maintained at 10° to 20° C. during this addition. The resulting solution was then gradually added with stirring to 260 grams of ethyl acetoacetate at from −2° C. to 0° C. The reaction mixture was then allowed to stand without agitation for about 48 hours at about −8° C. Finally, the mixture was drowned in cold water and extracted as in the preceding examples. The weight of the ethyl isodehydroacetate obtained was 46 grams; this represented a yield of 56.7% based on the amount of ethyl acetoacetate consumed. The weight of recovered ethyl acetoacetate was 151.6 grams.

*Example 4*

466 grams of chlorsulfonic acid was added dropwise to 200 grams of 95% ethyl alcohol as in the preceding examples. The resulting solution was then gradually added with stirring to 260 grams of ethyl acetoacetate at from 0° to 5° C. The reaction mixture was then allowed to stand without agitation for about 17 hours at from −10° to 0° C. Finally, the mixture was poured into an excess of cold water and purified as in the preceding examples. The weight of the distilled ethyl isodehydroacetate obtained was 101.6 grams; this represented a yield of 62% based on the amount of ethyl acetoacetate consumed. Weight of the recovered ethyl acetoacetate was 41.2 grams.

The above examples are clearly subject to numerous modifications in proportions, reaction conditions, reactants, etc. in accordance with the disclosure of this specification. Thus, n-propyl acetoacetate can be condensed to form n-propyl isodehydroacetate, etc.

The above examples illustrate the effect of various proportions of the condensing agent based on the weight of alkyl acetoacetate being condensed. Example 2 represents about 1.9, Example 3 about 0.65, and Example 4 about 2.56 weight proportions of condensing agent for each proportion of ethyl acetoacetate being condensed. It is apparent that the intermediate proportion viz. about 1.9, represents the most advantageous proportion illustrated although from about 1 to about 2.25 proportions can be quite advantageously employed.

What we claim as our invention is:

1. A process for preparing an alkyl isodehydroacetate comprising condensing under substantially anhydrous conditions an alkyl acetoacetate containing from 1 to 6 carbon atoms in the alkyl group at a temperature of from about −20° C. to about 30° C. in the presence of a condensing agent consisting of a mixture of from about 70 to 73 parts by weight of chlorsulfonic acid and about 28 to 31 parts by weight of ethyl alcohol.

2. A process for preparing an alkyl isodehydroacetate comprising condensing under substantially anhydrous conditions an alkyl acetoacetate containing from 1 to 6 carbon atoms in the alkyl group at a temperature of from about −20° to about 30° C. in the presence of a condensing agent consisting of a solution of hydrogen chloride in an approximately equimolecular quantity of ethyl sulfuric acid.

3. A process as defined in claim 2 wherein the alkyl group is methyl.

4. A process as defined in claim 2 wherein the alkyl group is ethyl.

5. A process as defined in claim 2 wherein the condensing agent is added to the alkyl acetoacetate slowly and with agitation so as to maintain a temperature below about 20° C. and then continuing the condensation for at least about 12 hours.

6. A process for preparing an alkyl isodehydroacetate comprising condensing under substantially anhydrous conditions, an alkyl acetoacetate containing from 1 to 6 carbon atoms in the alkyl group by gradually adding a condensing agent to the alkyl acetoacetate so as to maintain a temperature below about 20° C. and then continuing the condensation for at least about 12 hours at a temperature below about 30° C. said condensing agent consisting of a substantially anhydrous solution of hydrogen chloride dissolved in ethyl sulfuric acid.

7. A process as defined in claim 6 wherein the alkyl group is methyl.

8. A process as defined in claim 6 wherein the alkyl group is ethyl.

9. A process as defined in claim 6 wherein the reaction mixture obtained upon substantial completion of the condensation is separated so as to recover the unreacted alkyl acetoacetate which is then subjected to a repetition of the process as defined in claim 6 whereby a further quantity of alkyl isodehydroacetate is obtained.

10. A process for preparing an alkyl isodehydroacetate comprising condensing under substantially anhydrous conditions, an alkyl acetoacetate containing from 1 to 6 carbon atoms in the alkyl group by adding a condensing agent to the alkyl acetoacetate slowly and with mixing whereby a temperature below about 10° C. is maintained, and then continuing the condensation for at least about 12 hours at a temperature below about 20° C. said condensing agent consisting of a solution of hydrogen chloride dissolved in about an equimolecular proportion of ethyl sulfuric acid.

11. A process as defined in claim 10 wherein the condensing agent is added in a proportion by weight of from about one-half to about three times the weight of the alkyl acetoacetate to be condensed.

12. A process as defined in claim 11 wherein the reaction mixture obtained upon substantial completion of the condensation is separated so as to recover the unreacted alkyl acetoacetate which is then subjected to a repetition of the same condensation reaction as defined in claim 11.

13. A process as defined in claim 12 wherein the process for preparing the condensing agent comprises gradually adding from about 70 to about 73 parts by weight of chlorosulfonic acid to from about 28 to about 31 parts by weight of substantially pure ethyl alcohol at a temperature below about 20° C.

14. A process as defined in claim 13 wherein the alkyl group is ethyl.

15. A process as defined in claim 14 wherein the condensing agent is added in a proportion by weight of from about one to about two and a quarter times the weight of the ethyl acetoacetate to be condensed.

References Cited in the file of this patent

UNITED STATES PATENTS

| Number | Name | Date |
| --- | --- | --- |
| 2,529,917 | Coover et al. | Nov. 14, 1950 |
| 2,607,781 | Straley et al. | Aug. 19, 1952 |